(12) United States Patent
Brodsky et al.

(10) Patent No.: US 7,339,730 B2
(45) Date of Patent: Mar. 4, 2008

(54) ASSEMBLY AND METHOD FOR HEAD-UP DISPLAY (HUD) TRAY HARMONIZATION

(75) Inventors: Michael Brodsky, Rehovot (IL); Jacob Yosha, Shoham (IL)

(73) Assignee: Elop Electro-Optics Industries Ltd., Rehovot (IL)

( * ) Notice: Subject to any disclaimer, the term of this patent is extended or adjusted under 35 U.S.C. 154(b) by 26 days.

(21) Appl. No.: 11/332,218

(22) Filed: Jan. 17, 2006

(65) Prior Publication Data

US 2006/0181481 A1 Aug. 17, 2006

(30) Foreign Application Priority Data

Jan. 18, 2005 (IL) .................................... 166354

(51) Int. Cl.
*G02G 23/00* (2006.01)
*G02G 7/02* (2006.01)
(52) U.S. Cl. .................. 359/409; 359/399; 359/819; 353/13; 340/947
(58) Field of Classification Search ................ 359/362, 359/369, 629–630, 399–431, 808–830
See application file for complete search history.

(56) References Cited

U.S. PATENT DOCUMENTS

| 3,529,283 | A | * | 9/1970 | Emerson et al. | ............. 340/947 |
| 3,651,582 | A | * | 3/1972 | Lavarenne | .................... 701/16 |
| 5,381,267 | A | * | 1/1995 | Woody | ........................ 359/632 |
| 6,072,444 | A | * | 6/2000 | Burns | ............................. 345/7 |
| 6,343,863 | B1 | * | 2/2002 | Wood | ........................... 353/13 |

* cited by examiner

*Primary Examiner*—Thong Q. Nguyen
(74) *Attorney, Agent, or Firm*—Oblon, Spivak, McClelland, Maier & Neustadt, P.C.

(57) ABSTRACT

There is provided a head-up display (HUD) tray harmonization assembly, including a mount alignment jig (MAJ) having a first end and a second end, the first end being connectable to an adjustable tray affixed in an aircraft front cabin at spaced-apart relationship to a front window having a lower edge located adjacent the front end of the aircraft, a telescope connected to the MAJ at, or adjacent, its second end oriented for viewing through the window, a collimator holder having a first portion connectable to the outside wall of the front edge of the aircraft and a second portion extending towards and terminating at least at the lower edge of the window, and a collimator coupled to the second portion of the holder to form a line of sight with said telescope. A method for HUD tray harmonization is also provided.

8 Claims, 3 Drawing Sheets

ASSEMBLY AND METHOD FOR HEAD-UP DISPLAY (HUD) TRAY HARMONIZATION

FIELD OF THE INVENTION

The present invention relates to an assembly and method for head-up display (HUD) tray harmonization including combat and commercial passenger and freight air crafts.

BACKGROUND OF THE INVENTION

The present method of HUD tray harmonization illustrated in FIG. 1, consists of several cumbersome and tedious steps which comprise levelling of the entire aircraft 2, e.g., by utilizing hydraulic jacks and special level readers, the positioning of a target board 4 at a substantial distance L from the aircraft, e.g., at a distance of at least 25 m, the alignment of the target board with respect to height and angular orientation relative to the aircraft, mounting a telescope on a Mount Alignment Jig (MAJ), and adjusting the tray's disposition until the cross marks of the telescope and target coincide, and then tightly closing the connecting screws of the tray to lock the tray in the aligned position. It can be easily realized that such a procedure, which must be carried out outside a hangar, requires hard labor involved in levelling huge aircrafts and also suffers from the drawbacks of having to install and align a target at an open field, which target may be affected by prevailing winds and rain, and the costly personnel and equipment required, not to speak of the time necessary for performing such tasks.

SUMMARY OF THE INVENTION

It is therefore a broad object of the present invention to ameliorate the disadvantages of the prior art assembly and method of HUD tray harmonization and to provide an assembly and method which is simple to follow in all weather conditions, which is more accurate, quick and requires fewer technicians to carry out.

It is a further object of the present invention to provide an assembly and a method for HUD tray harmonization which does not require levelling of the aircraft and can be performed inside a hangar in all weather conditions.

In accordance with the present invention there is therefore provided a head-up display (HUD) tray harmonization assembly, comprising a mount alignment jig (MAJ) having a first end and a second end, said first end being connectable to an adjustable tray affixed in an aircraft front cabin at spaced-apart relationship to a front window having a lower edge located adjacent the front end of said aircraft; a telescope connected to the MAJ at, or adjacent, its second end oriented for viewing through said window; a collimator holder having a first portion connectable to the outside wall of said front edge of the aircraft and a second portion extending towards and terminating at least at the lower edge of said window, and a collimator coupled to the second portion of said holder to form a line of sight with said telescope.

The invention further provides a method for HUD tray harmonization, comprising providing an assembly as claimed in claim 1; attaching the telescope mounted MAJ to said adjustable tray and at least the second portion of said collimator mounted holder, to the front end of the aircraft in front of the pilot's seat; adjusting the tray to achieve alignment of the telescope and collimator's cursor, with respect to azimuth and elevation; tightly locking the tray to the cabin's roof at this position, and disassembling said assembly.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is illustrates a prior art method of HUD tray harmonization;

FIG. 2 is a side view of an aircraft front end showing the assembly and method of harmonization according to the present invention;

FIG. 3 is a front view of the assembly of FIG. 2, as mounted on an aircraft;

FIG. 4 is a perspective view of a MAJ, as mounted in a cockpit of a combat aircraft;

FIG. 5 is a side view of a cockpit showing a different type of a MAJ and a HUD tray, and FIG. 6 illustrates a side view of a HUD tray, a HUD and a pilot's seat inside a cockpit of a combat aircraft.

DETAILED DESCRIPTION OF THE PREFERRED EMBODIMENTS

Figure 1:
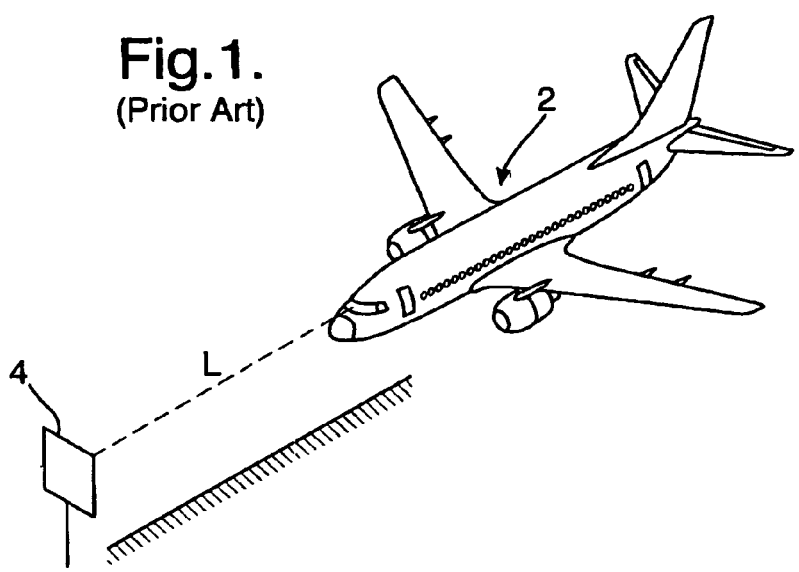
Figure 2:
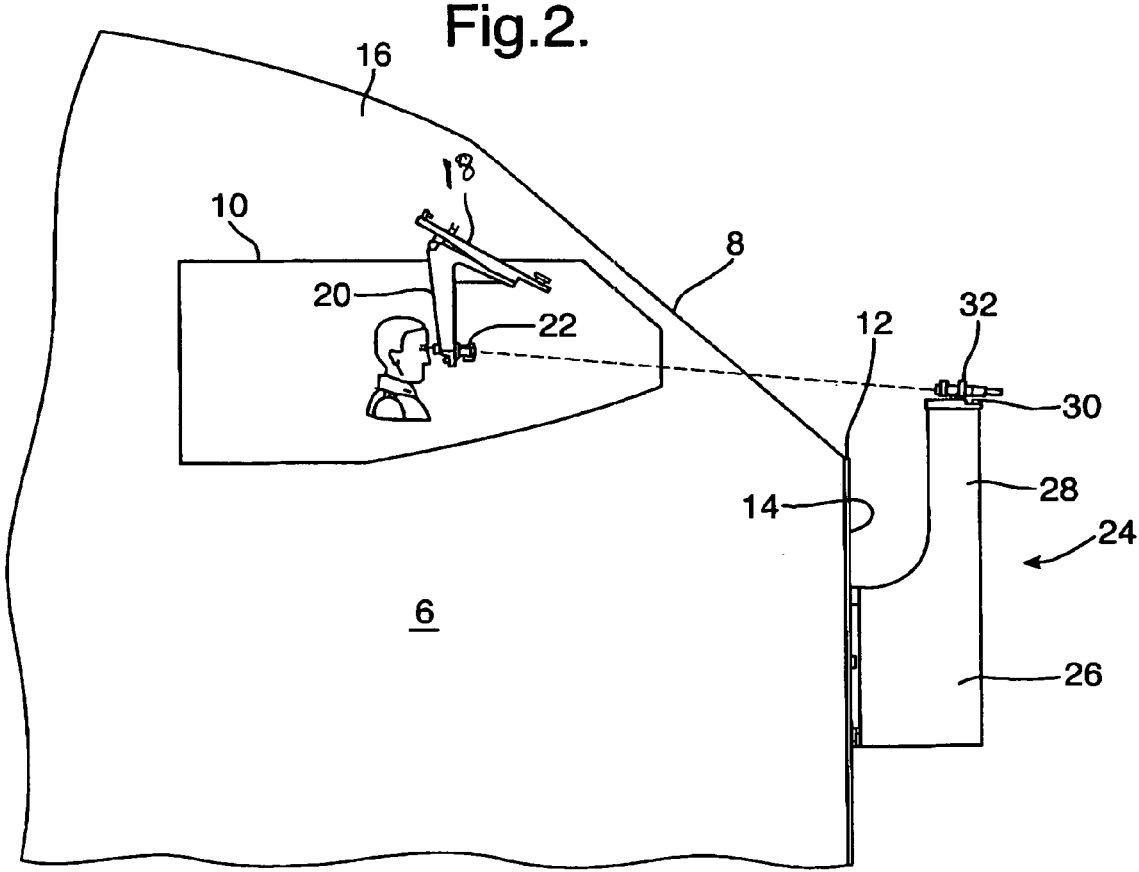
Figure 3:
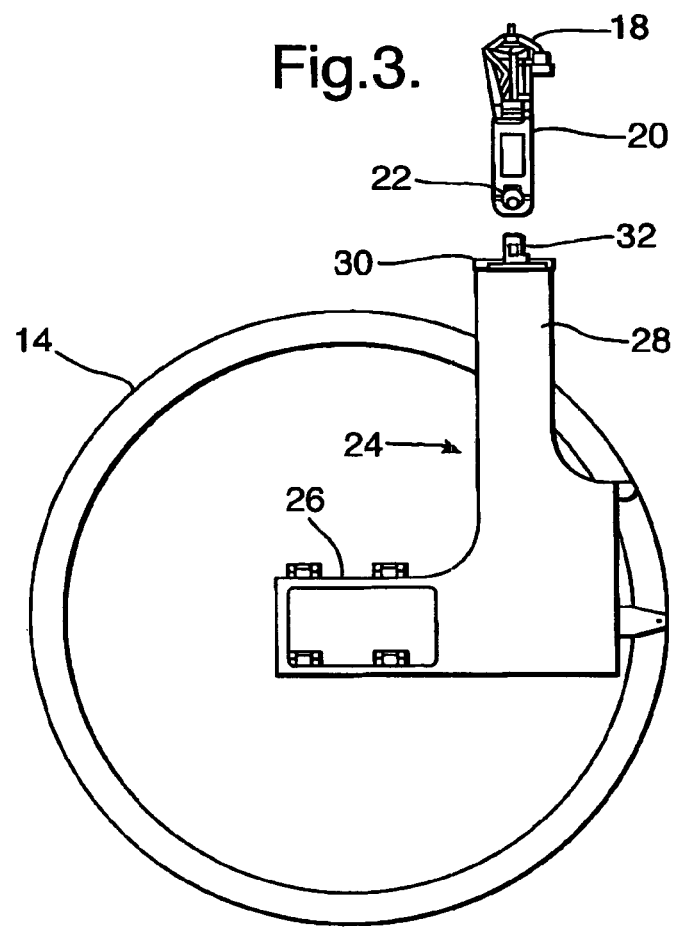

The assembly for HUD tray harmonization according to the present invention is illustrated in FIGS. 2 and 3. There is depicted the front end 6 of an aircraft having a front window 8 for the projection of displays and a side window 10. The front window has a lower edge 12, which merges with the aircraft's bulkhead 14. To the roof inside the aircraft cabin 16 there is affixed, usually by means of bolts, an adjustable HUD tray 18. To the latter there is affixed a MAJ 20 configured as an L-shaped unit, one arm of which is attachable to the tray 18, while the other arm extends towards the pilot's seat (not shown) inside the cabin 16. A telescope 22 is affixed to the free end portion of the other arm of the MAJ 20 facing the window 8. The MAJ 20 has an identical configuration and dimensions as that of a HUD mount. To the outside of the bulkhead 14 of the front end of the aircraft there is attached a collimator holder 24 (e.g., an L-shaped holder) having a first portion 26 connectable to any convenient location adjacent the lower edge 12 of the window 8, and a second portion 28, laterally displaced from portion 26 and extending upwardly towards the window 8, so as to project in front of the window 8 on the side of the window where the pilot's seat (as opposed to the co-pilot's seat) is located. The top edge of the second portion 28 is provided with coupling means 30 for coupling thereto an optical collimator 32.

The method of HUD tray harmonization according to the present invention is as follows: once tray harmonization is required, the aircraft inside or outside the hanger is fitted with the telescope mounted MAJ 20 inside the cabin 16 and with the collimator mounted holder 24, outside the cabin. The technician then, while sitting the pilot's seat, adjusts the loosely attached tray until the cursors, e.g., in the form of crosses, of the telescope 22 and of the collimator 32, coincide. The tray 18 is now tightly affixed and locked to the roof of the cabin and the MAJ 20 and the holder 24 disassembled. The MAJ 20 will now be replaced with a HUD mount, attached to the tray 18. The collimator 32 and holder 24 are designed in such a way that the collimator will represent the theoretical Line of Sight (LOS) of the pilot passing through the Designed Eye Position (DEP).

Figure 4:
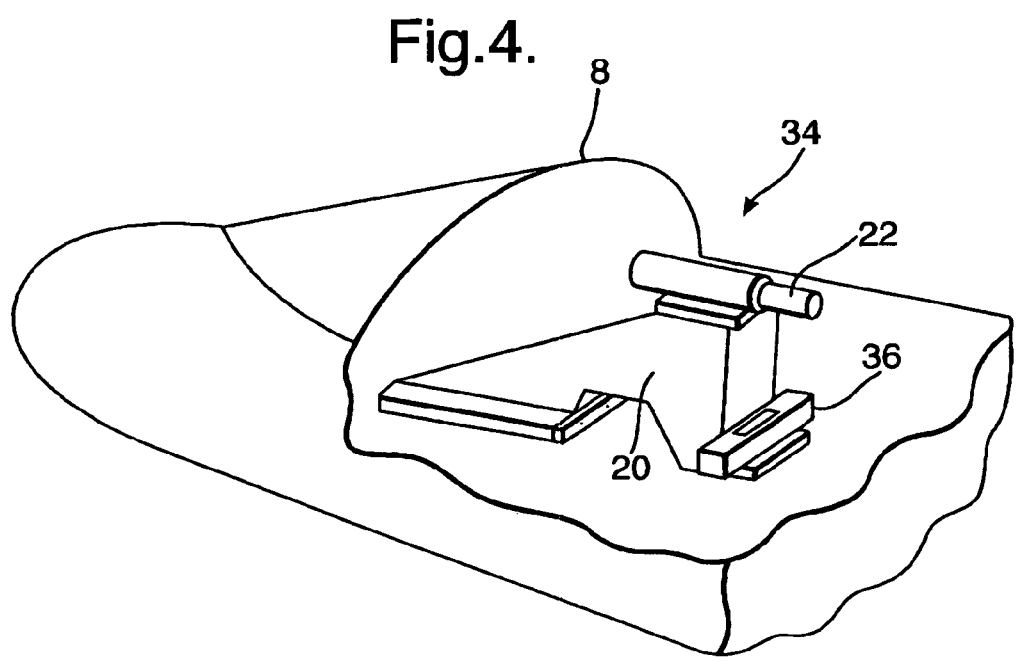
Figure 5:
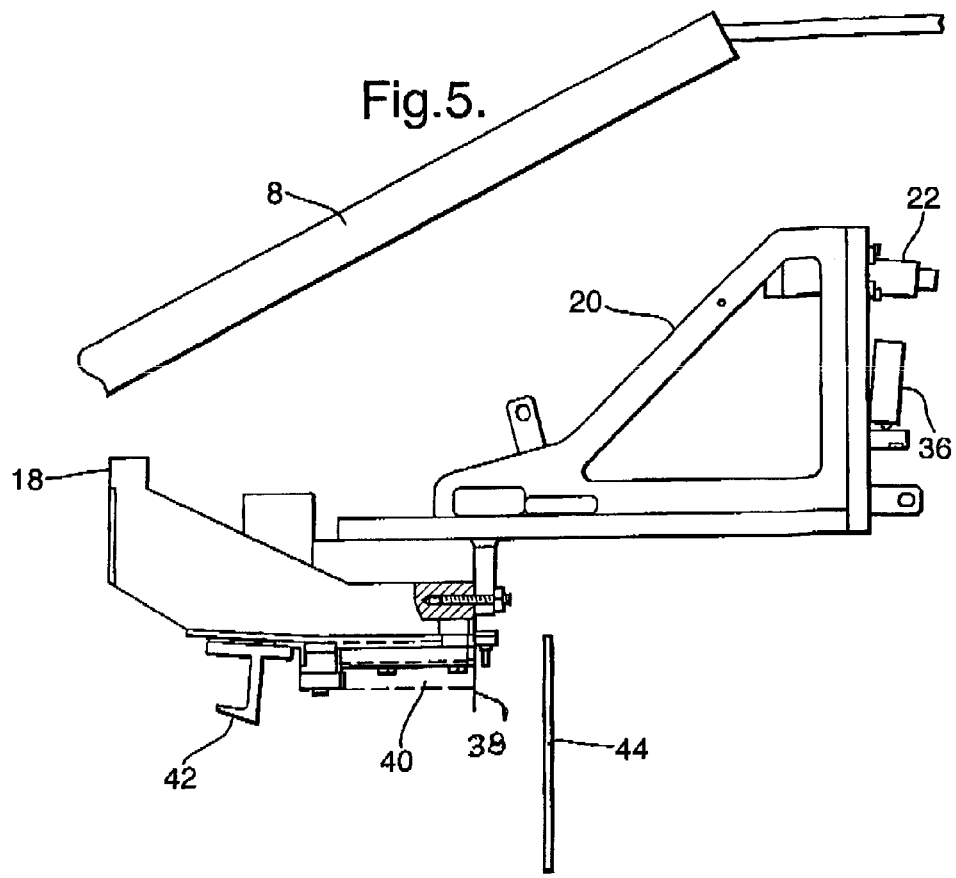
Figure 6:
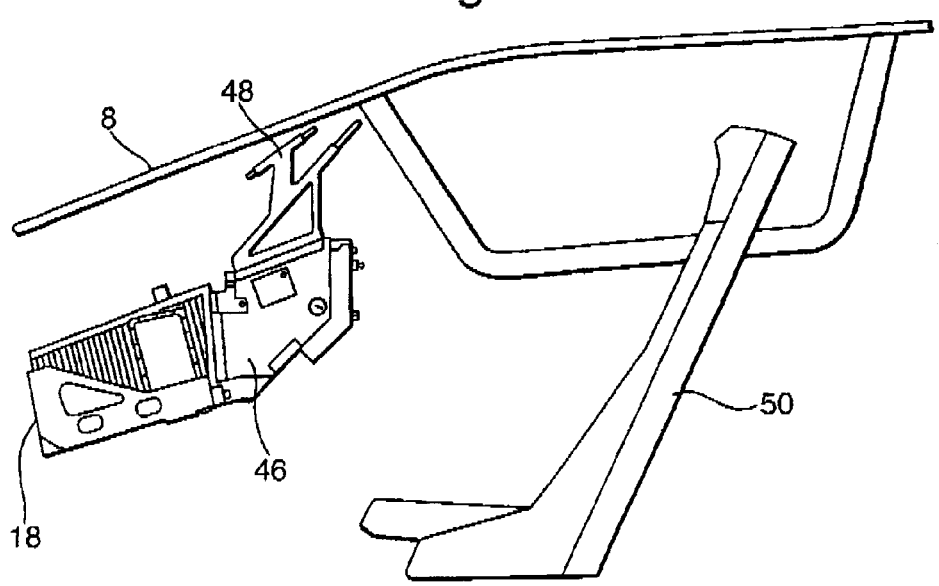

FIGS. 4 to 6 illustrate the utilization of the present invention inside a cockpit of a combat aircraft. In FIG. 4 there is illustrated a cockpit 34 having a front window 8, a MAJ 20, a telescope 22, and optionally, an inclinometer 36 for roll adjustment. Seen in FIG. 5 is a MAJ 20 of a slightly different configuration than that of FIG. 4, the telescope 22, the inclinometer 36, the HUD tray 18, the HUD/tray mounting surface 38, and a mount support 40, all bearing on the aircraft's beam 42. For better orientation, there is also depicted the cockpit's instrument panel 44. In FIG. 6 there is illustrated a HUD tray 18 and a HUD 46 having a combiner 48, as disposed between the pilot's seat 50 and the front window 8.

The collimator holder 24, which is mounted outside the cockpit, is not shown, however, the harmonization procedure as described hereinbefore, is the same.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A head-up display (HUD) tray harmonization assembly, comprising:
    a mount alignment jig (MAJ) having a first end and a second end, said first end being connectable to an adjustable tray affixed in an aircraft cabin having a pilot's seat, located in a front end of an aircraft, at a spaced-apart relationship to a front window having a lower edge located adjacent the front end of said aircraft;
    a telescope connected to the MAJ at, or adjacent, its second end oriented for viewing through said window;
    an optical collimator holder having a first portion connectable to an outside wall of said front end of the aircraft and a second portion extending towards and terminating at least at the lower edge of said window, and
    an optical collimator coupled to the second portion of said holder to form a line of sight with said telescope.

2. The assembly as claimed in claim 1, wherein the cabin has a roof and said tray is mounted in the roof of said cabin above the pilot's seat.

3. The assembly as claimed in claim 2, wherein said MAJ has, in cross-section, an L-shaped configuration having two arms, one arm of which is connectable to the tray and the other extends towards said pilot's seat.

4. The assembly as claimed in claim 1, wherein said holder is L-shaped and comprises first and second portions, said first portion including means for affixing the holder to the aircraft and said second portion having an edge including coupling means for affixing said optical collimator.

5. The assembly as claimed in claim 1, further comprising an inclinometer mounted on the MAJ for roll adjustment.

6. A method for HUD tray harmonization, comprising:
    providing an assembly as claimed in claim 1;
    attaching the telescope mounted MAJ to said adjustable tray and at least the first portion of said optical collimator holder, to the front end of the aircraft in front of the pilot's seat;
    adjusting the tray to achieve alignment of the telescope and a cursor of said optical collimator, with respect to azimuth and elevation;
    tightly locking the tray to a cabin's roof at this position, and
    disassembling said assembly.

7. The method as claimed in claim 6, further comprising attaching a HUD, to said tray.

8. The method as claimed in claim 6, further comprising providing an inclinometer mounted on said MAJ and adjusting the tray to achieve alignment of the telescope and collimator cursor with respect to roll.

* * * * *